United States Patent

Nabuurs

[11] Patent Number: 6,086,146
[45] Date of Patent: Jul. 11, 2000

[54] OPEN ROOF CONSTRUCTION FOR A VEHICLE

[75] Inventor: Martinus Wilhelmus Maria Nabuurs, Overloon, Netherlands

[73] Assignee: Inalfa Industries B.V., Netherlands

[21] Appl. No.: 09/145,771

[22] Filed: Sep. 2, 1998

[30] Foreign Application Priority Data

Sep. 18, 1997 [NL] Netherlands ............................ 1007065

[51] Int. Cl.⁷ .......................................... B60J 7/22
[52] U.S. Cl. ........................................ 296/217; 296/180.1
[58] Field of Search ............................... 296/217, 180.1

[56] References Cited

U.S. PATENT DOCUMENTS

| | | | |
|---|---|---|---|
| 2,964,352 | 12/1960 | Werner | 296/217 X |
| 5,671,970 | 9/1997 | Edelmann | 296/217 |
| 5,833,305 | 11/1998 | Watzlawick et al. | 296/217 |

FOREIGN PATENT DOCUMENTS

| | | | |
|---|---|---|---|
| 10 08 592 | 5/1957 | Germany | 296/217 |
| 3833046 | 4/1990 | Germany | 296/217 |
| 40 33 027 | 4/1992 | Germany . | |
| 43 34 011 | 11/1994 | Germany . | |
| 403248917 | 11/1991 | Japan | 296/217 |
| 2003801 | 3/1979 | United Kingdom | 296/180.1 |

*Primary Examiner*—Dennis H. Pedder
*Attorney, Agent, or Firm*—Westman, Champlin & Kelly, P.A.; S. Koehler

[57] ABSTRACT

An open roof construction for a vehicle having an opening in the roof plate comprises a closing element which closes said roof opening in its closed position and which can be moved rearwards from said closed position to an open position. An arrangement for influencing the air flow above the roof opening when said closing element is at least partially open is provided near the front edge of the roof opening. Said arrangement comprises means provided before the roof opening for generating an accelerated air flow over said roof opening. Said means may consist of a flow channel which is bounded on the upper side by an adjustable flap.

21 Claims, 2 Drawing Sheets

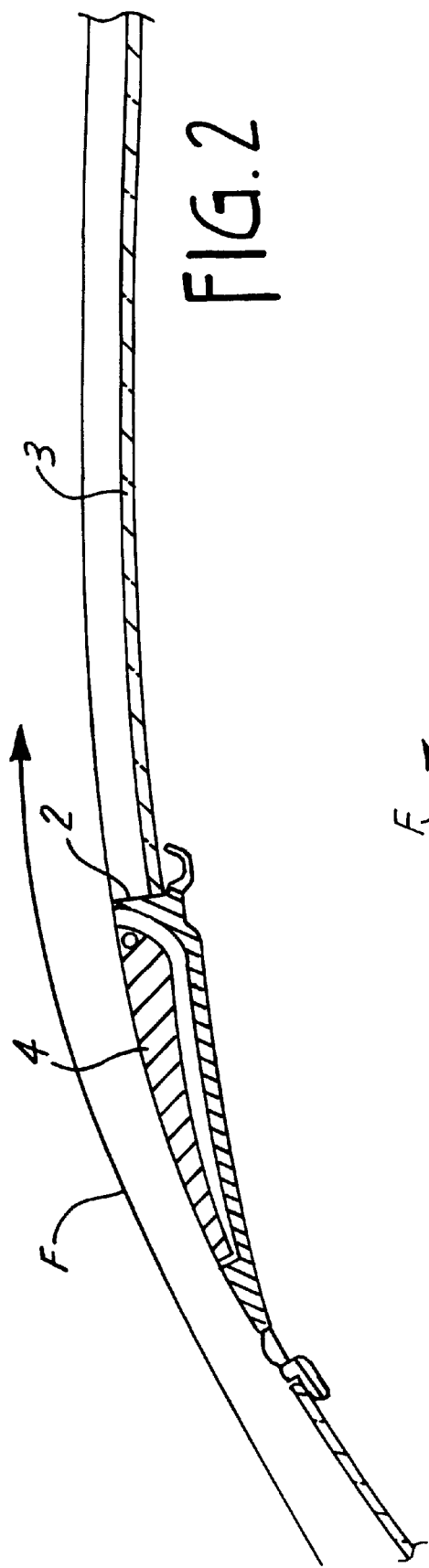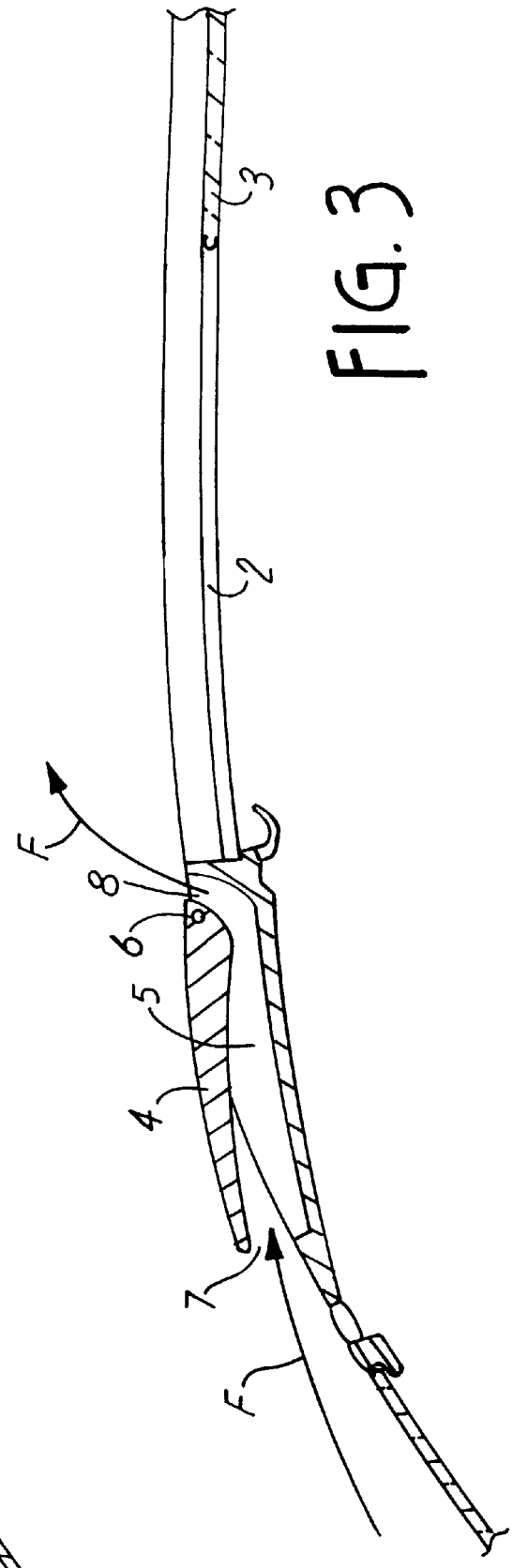

OPEN ROOF CONSTRUCTION FOR A VEHICLE

BACKGROUD OF THE INVENTION

1. Field of the Invention

The present invention relates to an open roof construction for a vehicle having an opening in the roof plate, said open roof construction comprising a closing element, which closes said roof opening in its closed position and which can be moved rearwards from said closed position to an open position, whereby an arrangement is provided near the front edge of the roof opening for influencing the air flow above the roof opening when said closing element is at least partially open.

2. Description of the Related Art

With many known open roof constructions, said arrangement is in the form of a wind deflector, which is fixedly mounted on the roof plate before the roof opening, or which is movably mounted on a frame within the roof opening. Such wind deflector functions to deflect the wind in upward direction away from the roof opening while driving. In the course of the years, however, it has become apparent that, partially because roof openings are made larger and larger, wind deflectors are no longer effective enough to prevent the occurrence of resonances between the air flow and the interior of the vehicle, the so-called "booming" effect. Various measures have been taken to modify the shape of the wind deflectors in order to lessen the above problem or eliminate it entirely, but these efforts have not been very successful.

The object of the present invention is to provide an open roof construction wherein the above-described problem is eliminated, or alleviated, in an efficient manner.

SUMMARY OF THE INVENTION

In order to accomplish that object, the open roof construction according to the invention is characterized in that said arrangement comprises means provided in front of the roof opening for generating an accelerated air flow over said roof opening.

By accelerating the air before the roof opening, it becomes possible to generate an air flow above the roof opening so that the "booming" problems no longer occur.

One possible embodiment of the invention is an embodiment wherein said means are comprised of a flow channel under the roof plate before the roof opening, and wherein said flow channel is preferably provided with an inlet which extends approximately horizontally, and with an outlet which slopes upwardly towards the rear.

Since the flow channel is formed under the roof plate, the appearance of the vehicle is hardly affected by this arrangement, if at all, and if the flow channel is bounded on the upper side by an adjustable part of the roof plate, the arrangement will only be activated when there is a need for it.

According to an effective method of increasing the air velocity, the flow channel is a venturi and the height and/or the width of the flow channel decreases in the direction of flow, for example.

Great comfort is obtained if the means for generating the air flow can be controlled automatically by means of a control unit, for example in dependence on the position of the closing element, the velocity of the vehicle and the like. In this way the most effective position of the means will be selected entirely automatically, which position can be influenced by various factors, but wherein the driver of the vehicle does not have to perform any operations himself.

The invention will be explained in more detail hereafter with reference to the drawings, which show an embodiment of the device according to the invention.

BRIEF DESCRIPTION OF THE DRAWINGS

FIGS. 2 and 3 are longitudinal sectional views of a part of the vehicle of FIG. 1, wherein two different positions of the open roof construction are shown.

DESCRIPTION OF THE PREFERRED EMBODIMENTS

Figure 1:
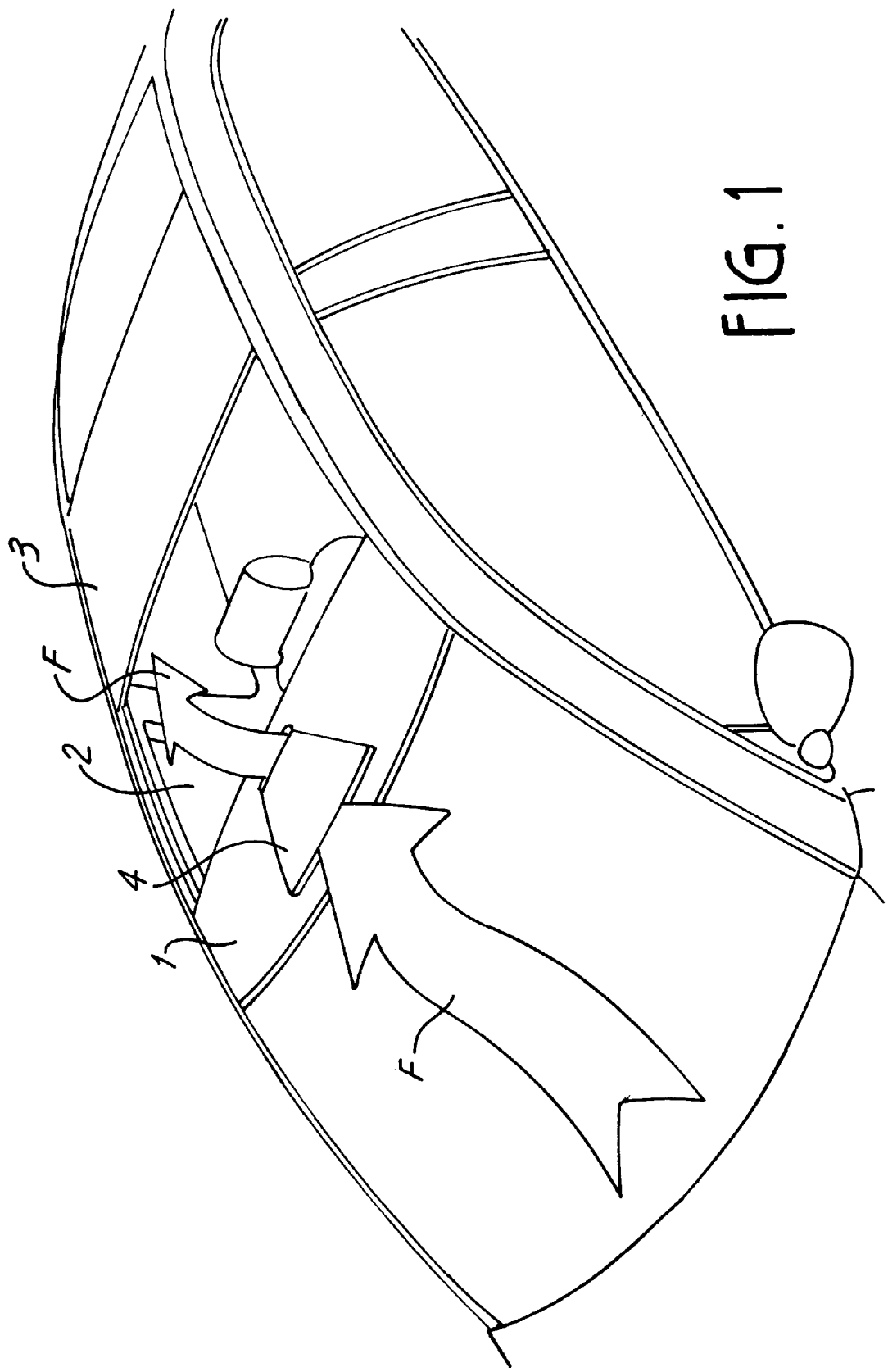
FIG. 1 is a perspective view of a part of a vehicle comprising the open roof construction according to the invention.

The drawing, and in the first instance FIG. 1, shows a vehicle comprising a roof plate 1, in which an opening 2 has been formed for the purpose of accommodating an open roof construction. In this embodiment the open roof construction comprises a closing element in the form of a rigid panel 3, which may or may not be transparent, and which closes the roof opening 2 in its closed position and which can be opened from said closed position, in any case by sliding the panel rearwardly under or over the roof plate 1. Closing element 3 may also be comprised of a foldable cover, slats or the like. The operating mechanism for the closing element 3, which is not shown, does not form part of the present invention.

The roof opening 2, which is relatively large, can be exposed to a large extent by panel 3, and in practice said relatively large opening leads to the so-called "booming" problem, whereby resonances occur between the wind flowing over roof opening 2 and the interior of the vehicle. In order to prevent this effect, the invention provides means for generating an accelerated air flow over the roof opening, that is, an air flow having a velocity which is much larger than the velocity of the vehicle. In the illustrated embodiment this has been effected by fitting the roof plate 1 before the roof opening with one or more adjustable parts or flaps 4, under which a flow channel 5 has been formed. The arrows in FIG. 1 indicate the air flow through flow channel 5.

FIGS. 2 and 3 show the flap 4 in two different positions thereof. Flap 4 is closed in FIG. 2, because the panel 3 of the open roof construction is closed as well, so that the air flow F can flow over the closed flap 4 and the panel 3 without impediment.

In FIG. 3 flap 4 is open, and in this position flap 4 has pivoted about a pin 6 present at the rear end of flap 4. As a result of this, an inlet 7 is formed on the front side of the flap, which inlet extends approximately horizontally and which scoops air into the flow channel 5, as it were. The air can leave the flow channel 5 again at an outlet 8, which sloped upwards to the rear at a relatively large angle. As is clearly shown in FIG. 1, the width of the flow channel 5 of inlet 7 decreases towards outlet 8, whilst also the height of the flow channel 5 decreases from inlet 7 towards outlet 8, as is shown in FIG. 3. Thus, a venturi effect is created in flow channel 5, whereby the velocity of the inflowing air is increased considerably, so that air flows out at a high velocity at outlet 8. This high velocity prevents the "booming" effect in an effective manner.

In the illustrated embodiment, outlet 8 of flow channel 5 extends over only a small part of the width of roof opening 2, which may be sufficient to prevent the "booming" effect.

Flow 5 may be given a greater width, or several flaps may be formed in side-by-side relationship in roof plate 1. Instead of using an upwardly pivoting flap 4, it is also possible, of course, to open the inlet in a different manner, for example by sliding the flap in upward direction, by sliding away a closing element or the like. Preferably, the construction is selected so that the appearance of the vehicle is affected as little as possible, in any case in the inactive position of the arrangement. Flap 4 is preferably adjusted by means of an electric motor. Thus it is possible, for example, to build a small electric motor into the flap itself. The electric control makes it possible to adjust the flap depending on the position of closing element 3, for example, so that it is possible to generate an optimally advantageous air flow over roof opening 2 in any position of the panel. Furthermore it is possible to link the position of valve 4 to the velocity of the vehicle.

From the foregoing it will be apparent that the invention provides an open roof construction and a vehicle fitted therewith, by means of which undesirable flow effects over the roof opening are prevented in an effective manner.

The invention is not limited to the above-described embodiment as shown in the drawing, which can be varied in several ways within the scope of the invention. Thus, the front part of the roof plate may form part of the vehicle, but it may also form part of the open roof construction. Alternatively, the open roof construction may be integrated in the entire roof plate.

I claim:

1. An open roof construction for a vehicle, the open roof construction comprising:

a roof having an opening;

a closing element selectively closing the opening in a closed position and movable rearward on the vehicle from the closed position to an open position; and a flow channel formed under a roof line of the roof forward of the opening, the flow channel having an inlet portion opening to an upper surface of the roof and forward of an outlet portion disposed proximate the opening, wherein the outlet portion extends at a larger angle to a horizontal reference than the inlet portion when viewed along a cross-section from the inlet portion to the outlet portion.

2. The open roof construction according to claim 1, wherein the flow channel is bounded on an upper side by an adjustable part.

3. The open roof construction according to claim 1, wherein the flow channel is a venturi.

4. The open roof construction according to claim 3, wherein at least one of a height and a width of the flow channel decreases in a direction of flow from the inlet portion to the outlet portion.

5. The open roof construction according to claim 1, wherein a portion of the flow channel after the inlet portion has a width less than a width of the roof opening.

6. The open roof construction according to claim 2, wherein the adjustable part is a flap, which is vertically adjustable, at least on a front side forming the inlet portion, for selectively forming or closing an opening of the inlet portion of the flow channel.

7. The open roof construction according to claim 6, wherein the flap is pivotable at an end proximate the roof opening.

8. An open roof construction for a vehicle, the open roof construction comprising:

a roof having an opening;

a closing element selectively closing the opening in a closed position and movable rearward on the vehicle from the closed position to an open position; and a flow channel fixed in the roof and formed under a roof line of the roof forward of the opening, the flow channel having an inlet portion opening to an upper surface of the roof and forward of an outlet portion disposed proximate the opening, wherein at least one of a height and a width of the flow channel decreases in a direction of air flow from the inlet portion to the outlet portion.

9. The open roof construction of claim 8 wherein the width of the flow channel decreases in the direction of air flow.

10. An open roof construction for a vehicle, the open roof construction comprising:

a roof having an opening;

a closing element selectively closing the opening in a closed position and movable rearward on the vehicle from the closed position to an open position; and a flow channel formed under a roof line of the roof forward of the opening, the flow channel having an inlet portion opening to an upper surface of the roof and forward of an outlet portion disposed proximate the opening, wherein a portion of the flow channel after the inlet portion has a width less than a width of the roof opening.

11. The open roof construction according to claim 10, wherein a lower surface of the flow channel is fixed in the roof and an adjustable part forms an upper surface.

12. The open roof construction according to claim 11, wherein the adjustable part is a flap, which is vertically adjustable, at least on a front side forming the inlet portion, for selectively forming or closing an opening of the inlet portion of the flow channel.

13. The open roof construction according to claim 12, wherein the flap is pivotable at an end proximate the roof opening.

14. An open roof construction for a vehicle, the open roof construction comprising:

a roof having an opening;

a closing element selectively closing the opening in a closed position and movable rearward on the vehicle from the closed position to an open position; and a movable flap forming a flow channel under a roof line of the roof forward of the opening, the flow channel having an inlet portion opening to an upper surface of the roof and forward of an outlet portion disposed proximate the opening, wherein the flap is pivotable about a stationary pivot to open and close an opening of the inlet portion.

15. An open roof construction for a vehicle, the open roof construction comprising:

a roof having an opening;

a closing element selectively closing the opening in a closed position and movable rearward on the vehicle from the closed position to an open position; and a venturi flow channel formed under a roof line of the roof forward of the opening, the venturi flow channel having an inlet portion opening to an upper surface of the roof and forward of an outlet portion disposed proximate the opening, wherein the outlet portion extends at a larger angle to a horizontal reference than the inlet portion when viewed along a cross-section from the inlet portion to the outlet portion, and wherein a portion of the venturi flow channel after the inlet portion has a width less than a width of the roof opening.

16. The open roof construction according to claim 15, wherein a lower surface of the venturi flow channel is fixed in the roof and an adjustable part forms an upper surface.

17. The open roof construction according to claim 16, wherein the adjustable part is a flap, which is vertically adjustable, at least on a front side forming the inlet portion, for selectively forming or closing an opening of the inlet portion of the flow channel.

18. The open roof construction according to claim 17, wherein the flap is pivotable at an end proximate the roof opening.

19. A method for directing air flow over a roof opening in a roof of a moving vehicle, the method comprising:

providing a flow channel with an outlet portion disposed in front of the roof opening and a flap pivotable about a stationary pivot located at a rear portion of the flap; and pivoting the flap to selectively allow air flow to flow through the flow channel.

20. The method of claim 19 and further comprising increasing a velocity of the air flow as the air flow flows through the flow channel.

21. The method of claim 19 wherein the stationary pivot is disposed rearward of an inlet portion of the flow channel and the step of pivoting comprises pivoting the flap to open an opening of the flow channel.

* * * * *